(12) United States Patent
Oh et al.

(10) Patent No.: US 11,206,277 B1
(45) Date of Patent: Dec. 21, 2021

(54) METHOD AND APPARATUS FOR DETECTING ABNORMAL BEHAVIOR IN NETWORK

(71) Applicant: KOREA INTERNET & SECURITY AGENCY, Jeollanam-do (KR)

(72) Inventors: Sung Taek Oh, Jeollanam-do (KR); Woong Go, Jeollanam-do (KR); Hong Geun Kim, Jeollanam-do (KR); Jae Hyuk Lee, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 17/200,622

(22) Filed: Mar. 12, 2021

(30) Foreign Application Priority Data

Nov. 24, 2020 (KR) ........................ 10-2020-0158678

(51) Int. Cl.
*H04L 29/06* (2006.01)
(52) U.S. Cl.
CPC ...... *H04L 63/1425* (2013.01); *H04L 63/0236* (2013.01); *H04L 63/0263* (2013.01); *H04L 63/1416* (2013.01); *H04L 63/1433* (2013.01); *H04L 63/20* (2013.01)
(58) Field of Classification Search
None
See application file for complete search history.

(56) References Cited

U.S. PATENT DOCUMENTS

| 9,565,203 | B2* | 2/2017 | Bernstein | H04L 63/1441 |
| 2015/0269383 | A1* | 9/2015 | Lang | H04L 63/20 726/1 |
| 2016/0142435 | A1* | 5/2016 | Bernstein | H04L 63/1441 726/23 |

(Continued)

FOREIGN PATENT DOCUMENTS

| KR | 10-1404312 B1 | 5/2014 |
| KR | 10-2015-0091775 A | 8/2015 |

(Continued)

OTHER PUBLICATIONS

Office Action dated Mar. 25, 2021, in Korean Patent Application No. 10-2020-0158678.

*Primary Examiner* — Joseph P Hirl
*Assistant Examiner* — Hassan Saadoun
(74) *Attorney, Agent, or Firm* — Sheppard Mullin Richter & Hampton LLP

(57) ABSTRACT

Provided is a method performed by a computing device for detecting abnormal behavior in a network. The method comprises obtaining a plurality of individual rules, wherein an individual rule of the plurality of individual rules is for extracting first output data from at least one input data set among a plurality of input data sets, the first output data satisfying a first extraction condition, obtaining a plurality of association rules, wherein an association rule of the plurality of association rules is for extracting second output data from at least one of the plurality of input data sets and the first output data, the second output data satisfying a second (Continued)

extraction condition and detecting abnormal behavior in a network based on third output data, the third output data being extracted using one of the plurality of individual rules and the plurality of association rules.

18 Claims, 10 Drawing Sheets

(56) References Cited

U.S. PATENT DOCUMENTS

| | | | | |
|---|---|---|---|---|
| 2016/0173495 A1* | 6/2016 | Joo | ....................... | H04L 63/102 |
| | | | | 713/171 |
| 2017/0013018 A1* | 1/2017 | Nakata | .................... | H04L 63/20 |
| 2017/0054745 A1* | 2/2017 | Zhang | .................... | H04L 67/06 |

FOREIGN PATENT DOCUMENTS

| | | | | |
|---|---|---|---|---|
| KR | 10-2018-0005359 A | | 1/2018 |
| KR | 10-2018-0086919 A | | 8/2018 |
| KR | 10-2018-0105688 A | | 9/2018 |
| KR | 10-2020-0025043 A | | 3/2020 |
| KR | 10-2020-0066428 A | | 6/2020 |
| KR | 20200078866 A | * | 7/2020 |
| KR | 10-2020-0108742 A | | 9/2020 |

* cited by examiner

METHOD AND APPARATUS FOR DETECTING ABNORMAL BEHAVIOR IN NETWORK

This patent application claims the benefit of Korean Patent Application No. 10-2020-0158678, filed on Nov. 24, 2020, which is hereby incorporated by reference in its entirety into this application.

FIELD

The present disclosure relates to a method and apparatus for detecting abnormal behavior in a network. More specifically, the present disclosure relates to a method and apparatus for detecting abnormal behavior in a network based on output data according to any one of a plurality of individual rules and a plurality of association rules.

DESCRIPTION OF THE RELATED ART

In general, methods for detecting abnormal behavior in a network are divided into a misuse detection method and an anomaly detection method.

First of all, the misuse detection method is to detect intrusion by applying more than hundreds of previously known attack patterns, and is a technology that generates a signature or rule database for known attack patterns, and detects a pattern matching them. Next, the anomaly detection method is a technology that detects various unknown behaviors deviating from statistics based on statistical data. Such an anomaly detection method has a problem in that a lot of learning data is required for a learning process to distinguish normal or abnormal based on statistical data.

With the development of network-related technologies, abnormal behavior in a network is also becoming complex and diversified. Therefore, a technology to detect abnormal behavior in a network based on various analysis scenarios is desired.

SUMMARY

The technical problem to be solved by some embodiments of the present disclosure is to provide a method and apparatus for detecting abnormal behavior in a network based on various analysis scenarios.

Another technical problem to be solved by some embodiments of the present disclosure is to provide a method and apparatus for detecting abnormal behavior in a network based on an individual rule and an association rule having relevance.

Another technical problem to be solved by some embodiments of the present disclosure is to provide a method and apparatus for detecting abnormal behavior in a network based on an association rule having a plurality of hierarchical relationships.

The technical problems of the present disclosure are not limited to the technical problems mentioned above, and other technical problems that are not mentioned will be clearly understood by those skilled in the art from the following description.

According to a method performed by a computing device for detecting abnormal behavior in a network comprising obtaining a plurality of individual rules, wherein the individual rule is for extracting first output data from at least one input data set among a plurality of input data sets, the first output data satisfying a first extraction condition, obtaining a plurality of association rules, wherein the association rule is for extracting second output data from at least one of the plurality of input data sets and the first output data, the second output data satisfying a second extraction condition and detecting abnormal behavior in a network based on third output data, the third output data being extracted using one of the plurality of individual rules and the plurality of association rules.

According to an embodiment, wherein the association rule includes a rule for extracting fourth output data satisfying a fourth extraction condition from the second output data.

According to an embodiment, wherein the detecting abnormal behavior in the network comprises, determining whether an attribute value of the third output data is equal to or greater than a threshold.

According to an embodiment, wherein the attribute value includes the number of the third output data, the number of groups included in the third output data and the number of data of a target group included in the third output data.

According to an embodiment, wherein the detecting abnormal behavior in the network comprises, determining whether an interval of extraction times of items in the third output data is equal to or less than a threshold.

According to an embodiment, wherein the abnormal behavior in the network includes an unauthorized eavesdropping behavior of an AI speaker, wherein the plurality of individual rules include a rule for extracting a first ID of a first process obtaining a microphone input from among IDs of processes run by the AI speaker, wherein the plurality of association rules include a first association rule for extracting a first ID of a first file generated by the first process among files existing in the AI speaker, a second association rule for extracting a list of second IDs of second processes accessing the first file from among IDs of processes run by the AI speaker, a third association rule for extracting a list of network sessions corresponding to each of the second processes, a fourth association rule for extracting, based on a predetermined blacklist, a subset of network session data from among entire network session data corresponding to the list of network sessions.

According to an embodiment, wherein the abnormal behavior in the network includes changing a host file of a router, wherein the plurality of individual rules include a rule for extracting data associated with changes of the host file, wherein the plurality of association rules include a first association rule for extracting a first domain name from among domain names directed by the changed host file, the first domain name being included in a predetermined blacklist list.

According to an embodiment, wherein the abnormal behavior in the network includes an attack against a device using firmware with a known vulnerability, wherein the plurality of individual rules include a rule for identifying a first firmware of an IoT devices connected to the network, wherein the plurality of association rules include a first association rule for identifying known vulnerability associated with the first firmware, a second association rule for detecting an attack corresponding to the identified known vulnerability.

According to an embodiment, wherein the plurality of association rules include a third association rule for extracting the number of the attacks against at least one of the plurality of IoT devices based on results of the detection.

According to an embodiment, wherein the abnormal behavior in the network includes a stealth scanning behavior, wherein the plurality of individual rules include a rule for extracting a device ID of a device visiting a domain included in a predetermined blacklist list from collected traffic data, wherein the plurality of association rules include a first association rule for extracting the number of FIN packets transmitted in a range of IP addresses corresponding to an IP address of a device having the device ID.

According to an embodiment, wherein the plurality of association rules further include a second association rule for extracting the number of SYN packets transmitted in a range of IP addresses corresponding to an IP address of a device having the device ID, wherein the detecting abnormal behavior in the network comprises, outputting a warning message based on the number of the FIN packets being greater than or equal to a first threshold or the number of the SYN packets being less than or equal to a second threshold.

According to an embodiment, wherein the abnormal behavior in the network includes communicating with a device included in a predetermined blacklist, wherein the plurality of individual rules include a rule for extracting a list of listen ports of a plurality of IoT devices connected to the network, wherein the plurality of association rules include a first association rule for extracting a newly created listen port from the list of listen ports, a second association rule for extracting a list of network sessions connected to the newly created listen port, a third association rule for extracting, based on a predetermined blacklist, a subset of network session data from among entire network session data corresponding to the list of network sessions.

According to another aspect of the present disclosure, there is provided an apparatus for detecting abnormal behavior in a network comprising a processor, a network interface, a memory and a computer program loaded into the memory and executed by the processor, wherein the computer program comprises, an instruction for obtaining a plurality of individual rules, wherein the individual rule is for extracting first output data from at least one input data set among a plurality of input data sets, the first output data satisfying a first extraction condition, an instruction for obtaining a plurality of association rules, wherein the association rule is for extracting second output data from at least one of the plurality of input data sets and the first output data, the second output data satisfying a second extraction condition and an instruction for detecting abnormal behavior in a network based on third output data, the third output data being extracted using one of the plurality of individual rules and the plurality of association rules.

According to another aspect of the present disclosure, there is provided a computer-readable recording medium recording a computer program including computer program instructions executable by a processor for detecting abnormal behavior in a network, wherein the computer program instructions are executed by a processor of a computing device for performing operations comprising, obtaining a plurality of individual rules, wherein the individual rule is for extracting first output data from at least one input data set among a plurality of input data sets, the first output data satisfying a first extraction condition, obtaining a plurality of association rules, wherein the association rule is for extracting second output data from at least one of the plurality of input data sets and the first output data, the second output data satisfying a second extraction condition and detecting abnormal behavior in a network based on third output data, the third output data being extracted using one of the plurality of individual rules and the plurality of association rules.

DETAILED DESCRIPTION

Figure 1:
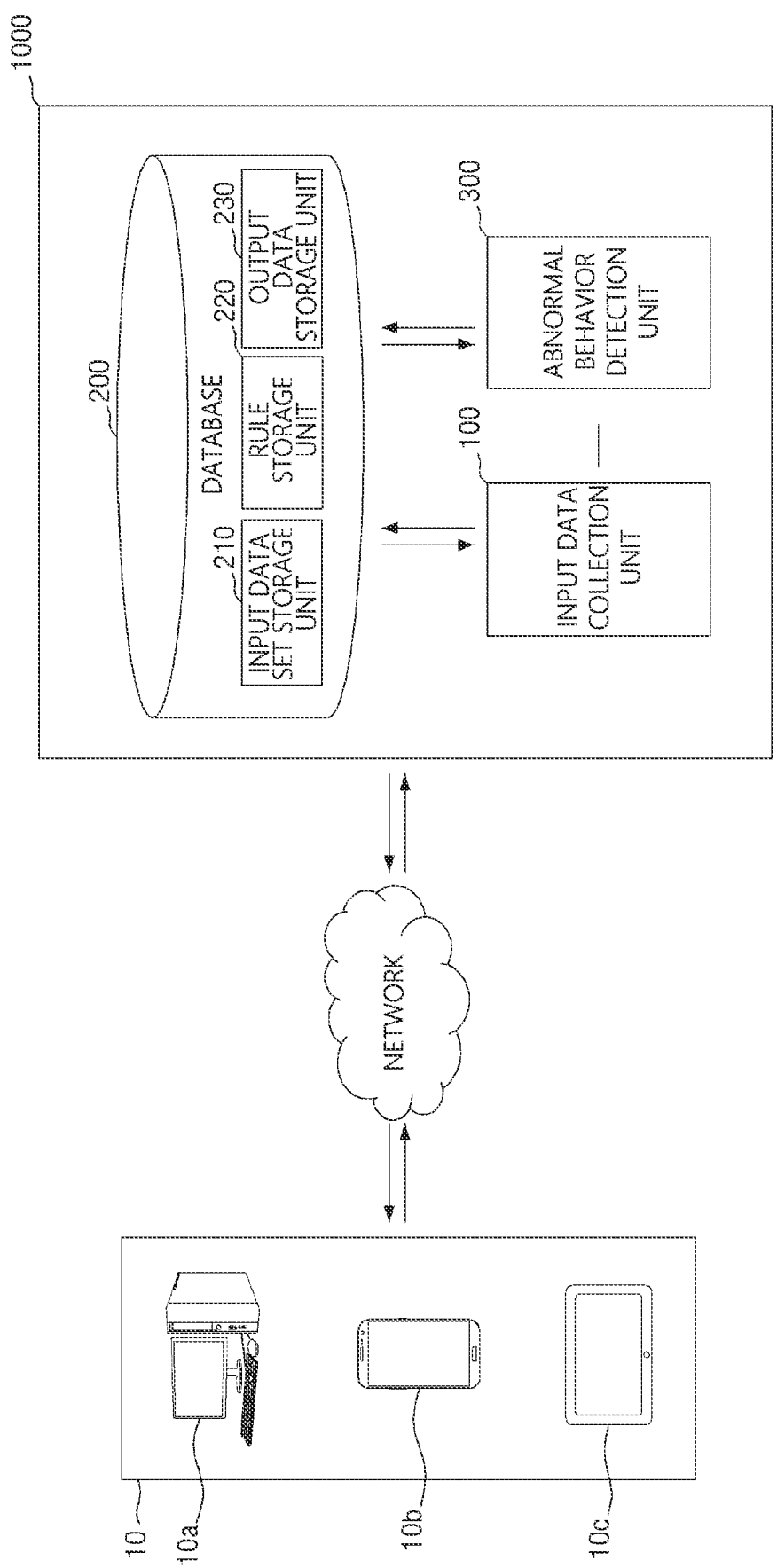
FIG. 1 is a diagram illustrating a system for detecting abnormal behavior in a network according to an embodiment of the present disclosure.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they may be shown in different drawings. In addition, in describing the present disclosure, based on determining that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries may not be properly interpreted unless they are specifically defined clearly. The terminology used herein may be for the purpose of describing example embodiments and may not be intended to be limiting of the present disclosure. In this specification, the singular also includes the plural unless specifically stated otherwise in the phrase.

In addition, in describing the component of this present disclosure, terms, such as first, second, A, B, (a), (b), can be used. These terms may be for distinguishing the components from other components, and the nature or order of the components may not be limited by the terms. Based on a component being described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

FIG. 1 is a diagram for describing a system for detecting abnormal behavior in a network according to an embodiment of the present disclosure. Referring to FIG. 1, a system for detecting abnormal behavior in a network may include a user terminal 10 and an apparatus 1000 for detecting abnormal behavior in a network. Each component of the system for detecting abnormal behavior in the network disclosed in FIG. 1 represents functional components that may be functionally divided, and any one or more components may be integrated with each other in an actual physical environment. Hereinafter, components of a system for detecting abnormal behavior in a network will be described in more detail.

FIG. 1 shows a plurality of user terminals connected to a network. For example, a first user terminal 10a, a second user terminal 10b, and a third user terminal 10c may be shown. It should be noted that FIG. 1 may be illustrative of a plurality of user terminals connected to a network, and the present disclosure may not be limited to the number of user terminals 100 shown in FIG. 1.

The user terminal 100 may receive a warning message for the abnormal behavior in the network detected and transmitted from the apparatus for detecting abnormal behavior in the network 1000. For example, abnormal behavior within the network may include unauthorized eavesdropping behavior of AI speakers, behavior of changing host files of a router, attacking behavior against devices using firmware with a known vulnerability, stealth scanning behavior, and communication behavior with a blacklist target. However, the types of abnormal behavior in the network detected by the present disclosure may not be limited to the examples.

The user terminal 10 may have a web browser or a dedicated application installed in order to receive a warning message for abnormal behavior in the network.

The user terminal 10, which can be referred to in some embodiments of the present disclosure, may be any device capable of receiving a warning message for abnormal behavior in the network transmitted from the apparatus for detecting abnormal behavior in the network 1000 through the network. For example, the user terminal 10 that can be referred to in some embodiments of the present disclosure may be any one of a desktop, a workstation, a server, a laptop, a tablet, a smartphone or a phablet, but may not be limited thereto, and it may be a type of device such as a portable multimedia player (PMP), personal digital assistants (PDA), or an E-book reader.

Next, the apparatus for detecting abnormal behavior in the network 1000 may include an input data set collection unit 100, a database 200, and an abnormal behavior detection unit 300. Hereinafter, the components of the apparatus for detecting abnormal behavior in the network 1000 will be described in more detail.

The input data set collection unit 100 may collect a plurality of input data sets. Here, the input data set may mean data for detecting abnormal behavior in the network. For example, process data running on a device connected to the network, file data generated by a device connected to the network, network session data of a target device attempting to access a device connected to the network, traffic data transmitted and received by a device connected to the network, and port data of a device connected to the network may be an input data set. It should be noted that the input data set collected in the present disclosure may not be limited to the above-described examples, and all data for detecting abnormal behavior in the network may be included in the input data set.

Also, the input data set collection unit 100 may pre-process the collected input data set. Here, the operation of pre-processing the input data set may refer to extracting and processing the collected input data set into meaningful data. Any known technique for collecting and parsing an input data set can be applied here.

Further, the input data set collection unit 100 may store the collected input data set in the database 200. For example, the input data set collection unit 100 stores the collected input data set in the input data set storage unit 210.

Further, the input data set collection unit 100 may transmit the pre-processed input data set to the abnormal behavior detection unit 300 in the form of a message queue. In some embodiments related to this, by setting a time interval of the message queue that the input data set collection unit 100 transmits to the abnormal behavior detection unit 300, the abnormal behavior detection period may be determined as a period preset by the user. In some other embodiments, the input data set collection unit 100 may transmit the input data set to the abnormal behavior detection unit 300 in real time, so that abnormal behavior in the network may be detected in real time.

Next, the abnormal behavior detection unit 300 may detect abnormal behavior in the network based on the input data set received from the input data set collection unit 100. For example, the abnormal behavior detection unit 300 obtains a rule stored in the rule storage unit 220 of the database 200. Next, from the collected input data set, output data that satisfies the rule extraction condition may be extracted. Next, based on the output data, abnormal behavior in the network may be detected. An example operation of the abnormal behavior detection unit 300 will be detailed later through description of the specification.

Further, the abnormal behavior detection unit 300 may store the extracted output data in the output data storage unit 230 of the database 200. In this case, the output data storage unit 230 may store the output data extracted by each rule for each rule as the basis data. Further, based on detecting for each rule an attack type corresponding to each rule, data on the output warning message may be stored as alarm information along with the basis data.

Further, the abnormal behavior detection unit 300 may transmit a warning message to the user terminal 10 based on output data extracted from the input data set according to the rule extraction condition.

In the above, a system for detecting abnormal behavior in a network according to an embodiment of the present disclosure has been described in detail with reference to FIG. 1. According to the present embodiment described with reference to FIG. 1, by detecting the abnormal behavior by the apparatus for detecting abnormal behavior in the network 1000, it may be possible to protect devices connected to the network. For example, by detecting an abnormal behavior in the network according to an association rule that will be specified later in the specification, abnormal behavior in the network may be detected based on various analysis scenarios.

Hereinafter, a method for detecting abnormal behavior in a network according to another embodiment of the present disclosure will be described in detail with reference to FIGS. 2 to 9.

Figure 2:
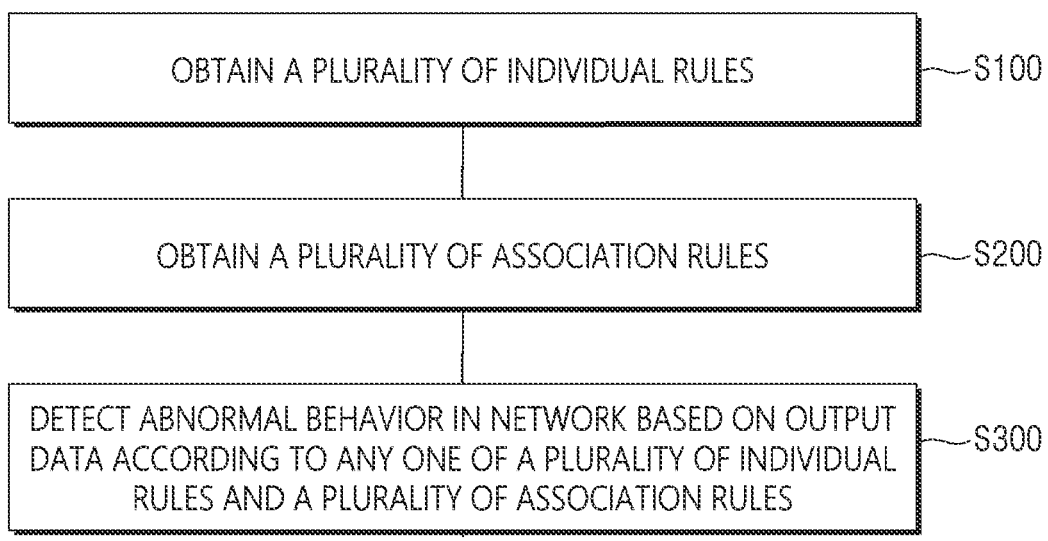
FIG. 2 is a diagram for describing a method of detecting abnormal behavior in a network according to another embodiment of the present disclosure.

FIG. 2 is a diagram for describing a method of detecting abnormal behavior in a network according to another embodiment of the present disclosure. The method for detecting abnormal behavior in a network according to the present embodiment may be performed by a computing device. For example, the method for detecting abnormal behavior in the network according to the present embodiment may be performed by the apparatus for detecting abnormal behavior in the network shown in FIG. 1. Further, the method according to the present embodiment may be performed by being divided by the first computing device and the second computing device. Hereinafter, in performing each operation of the method according to the present embodiment, based on the description of the subject being omitted, the subject may be interpreted as being the computing device.

Referring to FIG. 2, in step S100, a plurality of individual rules may be obtained. Here, the individual rule may be a rule for extracting output data that satisfies an extraction condition from at least one input data set among a plurality of input data sets. In this case, the extraction condition may be a condition including at least one condition. For example, as the extraction condition, a first condition that may be a data type, and a second condition that may be a file name may be considered as conditions. However, it should be noted that extraction conditions may not be limited to that the number of conditions may be two as in this example.

Next, in step S200, a plurality of association rules may be obtained. Here, the association rule may be a rule for extracting output data satisfying an extraction condition from at least one of a plurality of input data sets and output data according to individual rules. That is, the association rule may extract the second output data different from the first output data that satisfies the extraction condition based on the first output data according to the individual rule, so that abnormal behavior in the network can be detected by various analysis scenarios based on relevancy between a plurality of rules. Based on describing the relationship between the individual rule and the association rule in more detail, in the association rule, the first output data extracted by the individual rule may be used as target data of the association rule, or the first output data may be used as the extraction condition of the association rule. Details of the relationship between individual rules and association rules may be understood with reference to FIGS. 4 to 9 later.

In some embodiments related to step S200, obtaining a plurality of association rules may comprise obtaining an association rule for extracting output data that satisfies an extraction condition from output data according to any one of the plurality of association rules. The association rule may extract the fourth output data different from the third output data that satisfies the extraction condition based on the third output data according to any one association rule included in the plurality of association rules, so that abnormal behavior in the network can also be detected by various analysis scenarios based on the relevancy of a plurality of rules. That is, by associating another association rule with the association rule, abnormal behavior in the network may be detected by more various analysis scenarios. Detailed contents related to this may also be understood with reference to FIGS. 4 to 9 later.

Next, in step S300, abnormal behavior in the network may be detected based on the output data according to any one of a plurality of individual rules and a plurality of association rules.

In step S300, based on the rule for extracting the output data being a rule for counting the extraction time interval and comparing it with a threshold, a warning message may be output based on the extraction time interval of the extracted output data being less than or equal to the threshold, or greater than or equal to the threshold. In one example, based on the predetermined threshold being 1 minute, a warning message may be output based on the extraction time interval of output data being 1 minute or less. Here, it should be noted that the threshold can be freely changed in response to the type of attack to be detected. According to the present embodiment, abnormal behavior in the network can be detected based on the extraction time interval of output data.

In step S300, based on the rule for extracting the output data being a rule for comparing the attribute value of the extracted output data and the threshold, a warning message may be output based on the attribute value of the extracted output data being less than or equal to the threshold, or greater than or equal to the threshold. Here, the attribute value may include the number of output data, the number of groups included in the output data, and the number of data of the target group included in the output data. In one example, based on a group of output data being a process ID list accessing a target file, a warning message may be output based on the number of groups grouped for each same process ID may be greater than or equal to a predetermined threshold. In another example, based on the number of FIN files transmitted in the target device IP band as the output data being greater than or equal to a predetermined threshold, a warning message may be output. According to the present embodiment, abnormal behavior in the network may be detected based on the attribute value of the output data.

Figure 3:
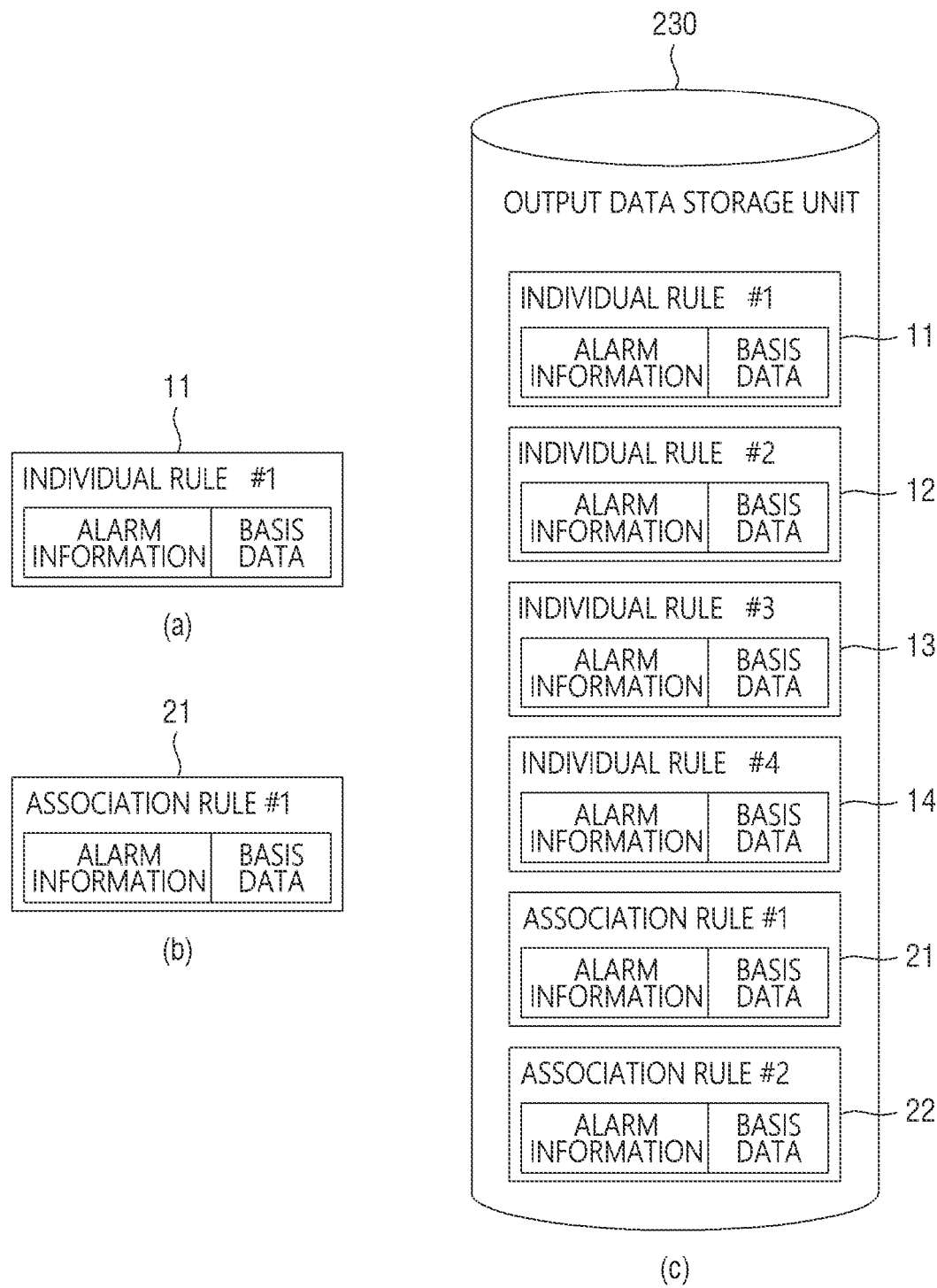
FIG. 3 is a diagram for describing in more detail an output data storage unit that can be referred to in some embodiments of the present disclosure.

As described above, based on abnormal behavior in the network being detected based on the output data, output data, which may be the basis of the detection, and alarm information may be stored together. FIG. 3 will be referred for a more detailed description related to this. FIG. 3 is a diagram for describing in more detail an output data storage unit that can be referred to in some embodiments of the present disclosure.

Referring to (a) of FIG. 3, a first individual rule 11 may be shown, and referring to (b) of FIG. 3, a first association rule 21 may be shown, and referring to (c) of FIG. 3, the first individual rule 11, the second individual rule 12, the third individual rule 13, the fourth individual rule 14, the first association rule 21 and a second association rule 22 stored in the output data storage unit 230 may be shown. As described above, based on abnormal behavior in the network being detected based on the output data, the output data, which may be the basis of the detection, and alarm information may be stored together in the output data storage unit 230. According to the present embodiment, the alarm information and the basis data may be stored together, so that the user can grasp output data corresponding to the cause of the warning message and the history of the warning message.

As described above, according to the method for detecting abnormal behavior in a network according to another embodiment of the present disclosure described with reference to FIGS. 2 to 3, it may be possible to detect abnormal behavior in the network by various analysis scenarios based on the relevancy between a plurality of rules. Hereinafter, an operation of detecting an individual attack type by applying a method for detecting abnormal behavior in a network according to another embodiment of the present disclosure will be described in more detail with reference to FIGS. 4 to 9.

Figure 4:
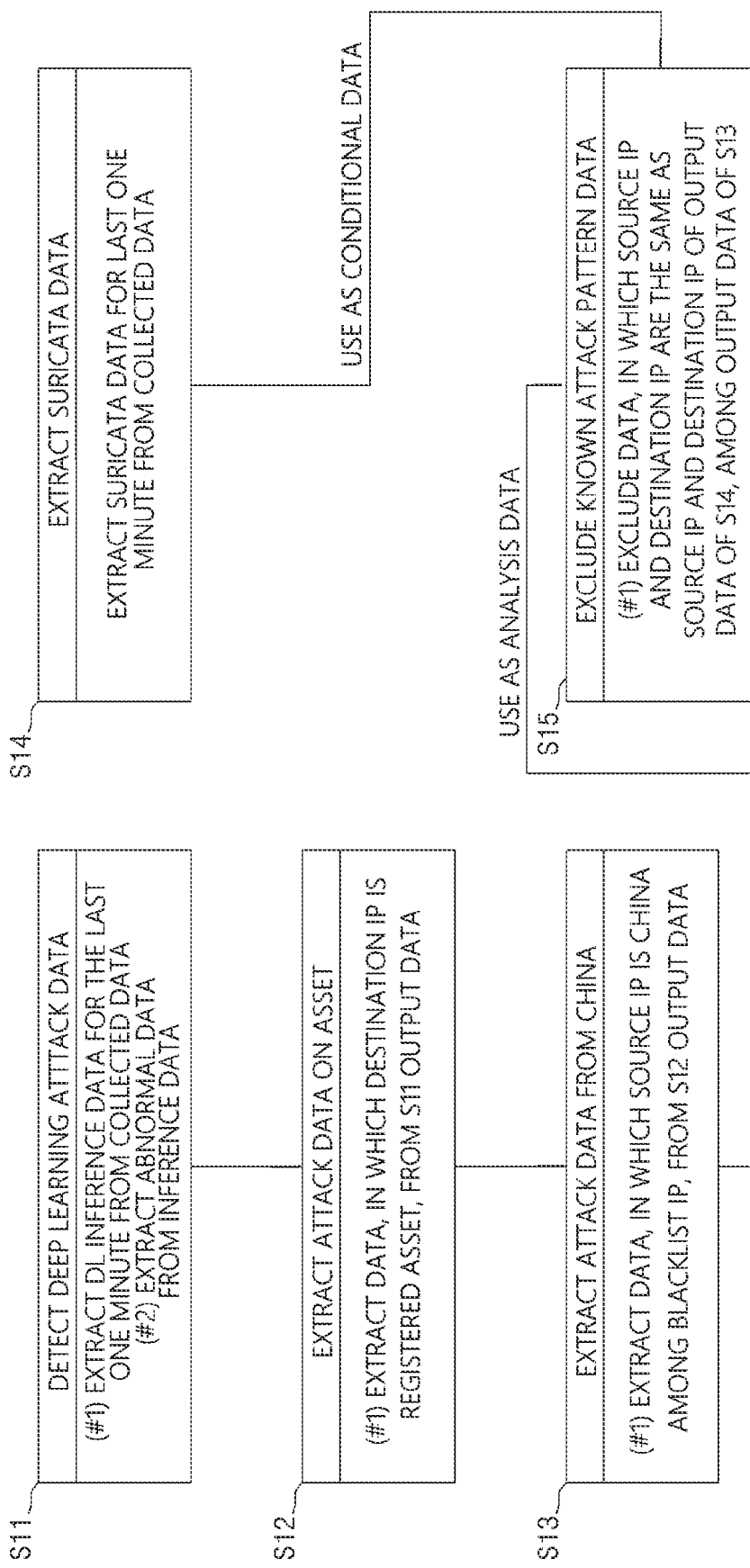
FIG. 4 is an exemplary diagram for describing an operation of detecting a novel attack pattern type by applying the method for detecting abnormal behavior in a network described with reference to FIG. 2.

FIG. 4 is an exemplary diagram for describing an operation of detecting a novel attack pattern type by applying the method for detecting abnormal behavior in a network described with reference to FIG. 2.

Referring to FIG. 4, in step S11, attack data may be detected using deep learning. This step may be performed by any one of a plurality of individual rules. Further, this step includes a first condition and a second condition. Here, the first condition may be a condition for extracting inference data based on deep learning for the last one minute of the collected data, and the second condition may be a condition for extracting abnormal data from the extracted inference data.

Next, in step S12, attack data on the asset may be extracted. This step may be performed by any one of a plurality of association rules. This step includes a first condition of extracting data that may be an asset, in which the destination IP is connected to the network, among the output data according to step S11.

Next, in step S13, attack data from China may be extracted. This step may be performed by any one of a plurality of association rules. This step includes a first condition of extracting data, in which source IP may be a Chinese band, among the output data according to step S12.

Next, in step S14, Suricata data may be extracted. This step may be performed by any one of a plurality of individual rules. This step includes a first condition of extracting Suricata data for the last one minute of the collected data.

Next, in step S15, known attack pattern data may be excluded. This step may be performed by any one of a plurality of association rules. This step includes a first condition of excluding data, in which the combination of the source IP and destination IP of the output data in step S13 and the combination of the source IP and destination IP of the output data in step S14 may be the same.

According to the steps described above, among the attack data extracted by deep learning, novel attack data excluding known attack data may be extracted as output data of step S15. For example, based on a warning message being output based on the number of output data being greater than or equal to the threshold of 1, a warning message may be output based on the number of output data in step S15 being greater than or equal to 1, so that a warning message for the novel attack pattern type can be transmitted to the user.

Figure 5:
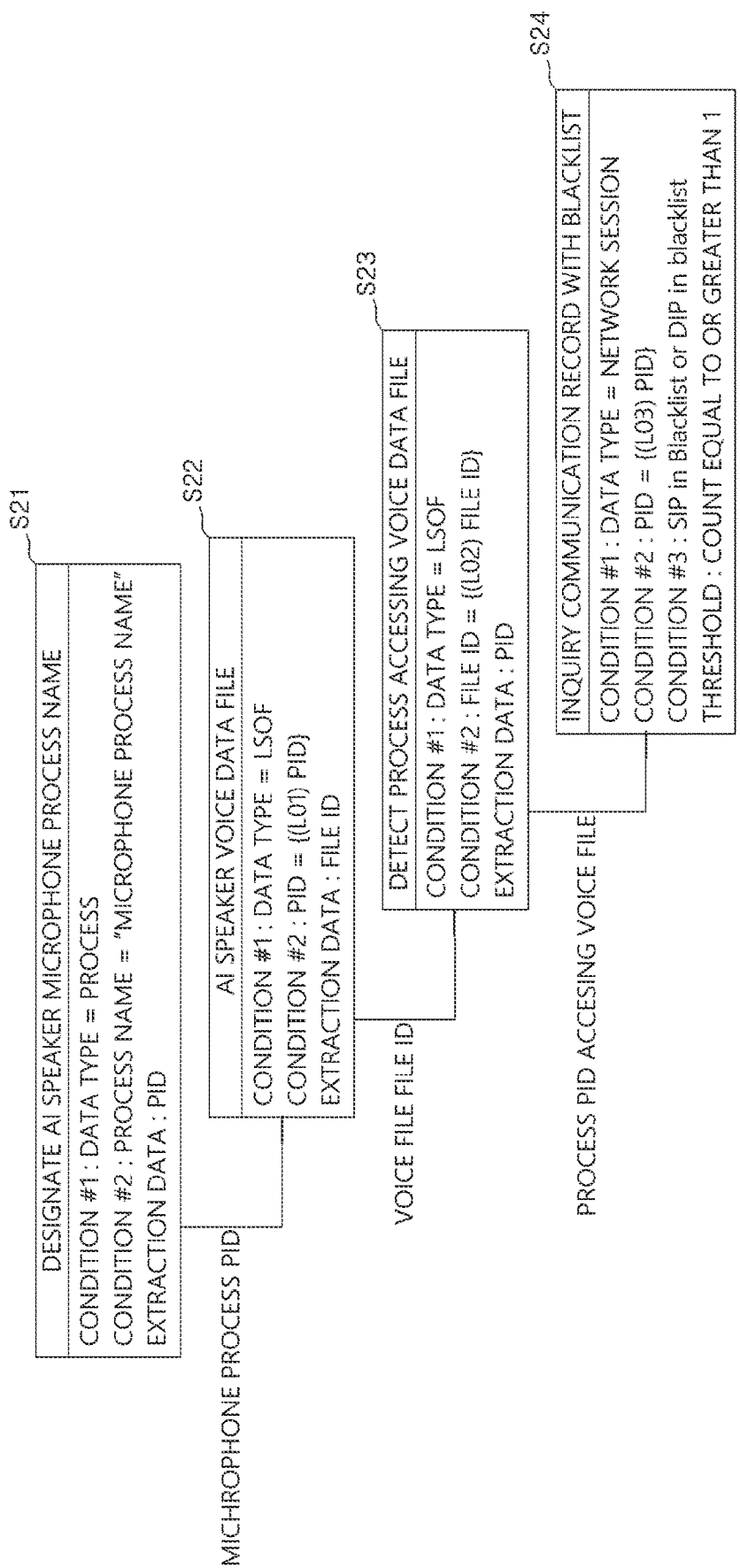
FIG. 5 is an exemplary diagram for describing an operation of detecting unauthorized eavesdropping behavior of an AI speaker by applying the method for detecting abnormal behavior in a network described with reference to FIG. 2.

FIG. 5 may be an exemplary diagram for describing an operation of detecting unauthorized eavesdropping behavior of an AI speaker by applying the method for detecting abnormal behavior in a network described with reference to FIG. 2.

Referring to FIG. 5, in step S21, a process ID for obtaining a microphone input may be extracted among from IDs of processes running in the AI speaker. This step may be performed by any one of a plurality of individual rules.

Next, in step S22, a file ID generated by a process ID for obtaining a microphone input among files existing in the AI speaker may be extracted. This step may be performed by any one of a plurality of association rules.

Next, in step S23, a process ID list accessing the file ID may be extracted. This step may be performed by any one of a plurality of association rules.

Next, in step S24, a network session list corresponding to each process ID included in the process ID list accessing the file ID may be extracted, and the network session data included in the predetermined blacklist list among network session data included in the network session list may be extracted. This step may be performed by any one of a plurality of association rules.

According to the steps described above, the network session data included in the blacklist list unauthorizedly eavesdropping the AI speaker may be extracted. For example, based on a warning message being output based on the number of output data being equal to or greater than the threshold of 1, a warning message may be output based on the number of output data in step S24 being equal to or greater than 1, so that a warning message for unauthorized eavesdropping on an AI speaker may be transmitted to the user.

Figure 6:
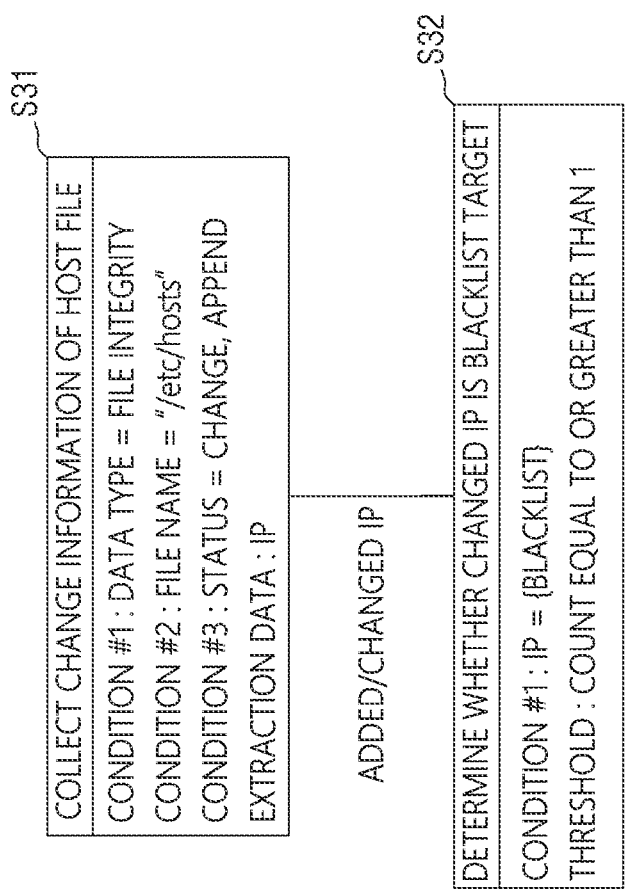
FIG. 6 is an exemplary diagram for describing an operation of detecting host file changing behavior of a router by applying the method for detecting abnormal behavior in a network described with reference to FIG. 2.

FIG. 6 is an exemplary diagram illustrating an operation of detecting a host file changing behavior of a router by applying the method for detecting abnormal behavior in a network described with reference to FIG. 2.

Referring to FIG. 6, in step S31, change data of the host file may be extracted. This step may be performed by any one of a plurality of individual rules.

Next, in step S32, a domain included in a predetermined blacklist list among domains, to which the host file connects, may be extracted based on the change data. This step may be performed by any one of a plurality of association rules.

According to the steps described above, a domain included in the blacklist list hosted by the changed hosts file may be extracted. For example, based on a warning message being output based on the number of output data being equal to or greater than the threshold of 1, a warning message may be output based on the number of output data in step S32 being equal to or greater than 1, so that the host file of the router may be changed and a warning message about an abnormal behavior of unauthorized hosting to the domain included in the blacklist list may be transmitted to the user.

Figure 7:
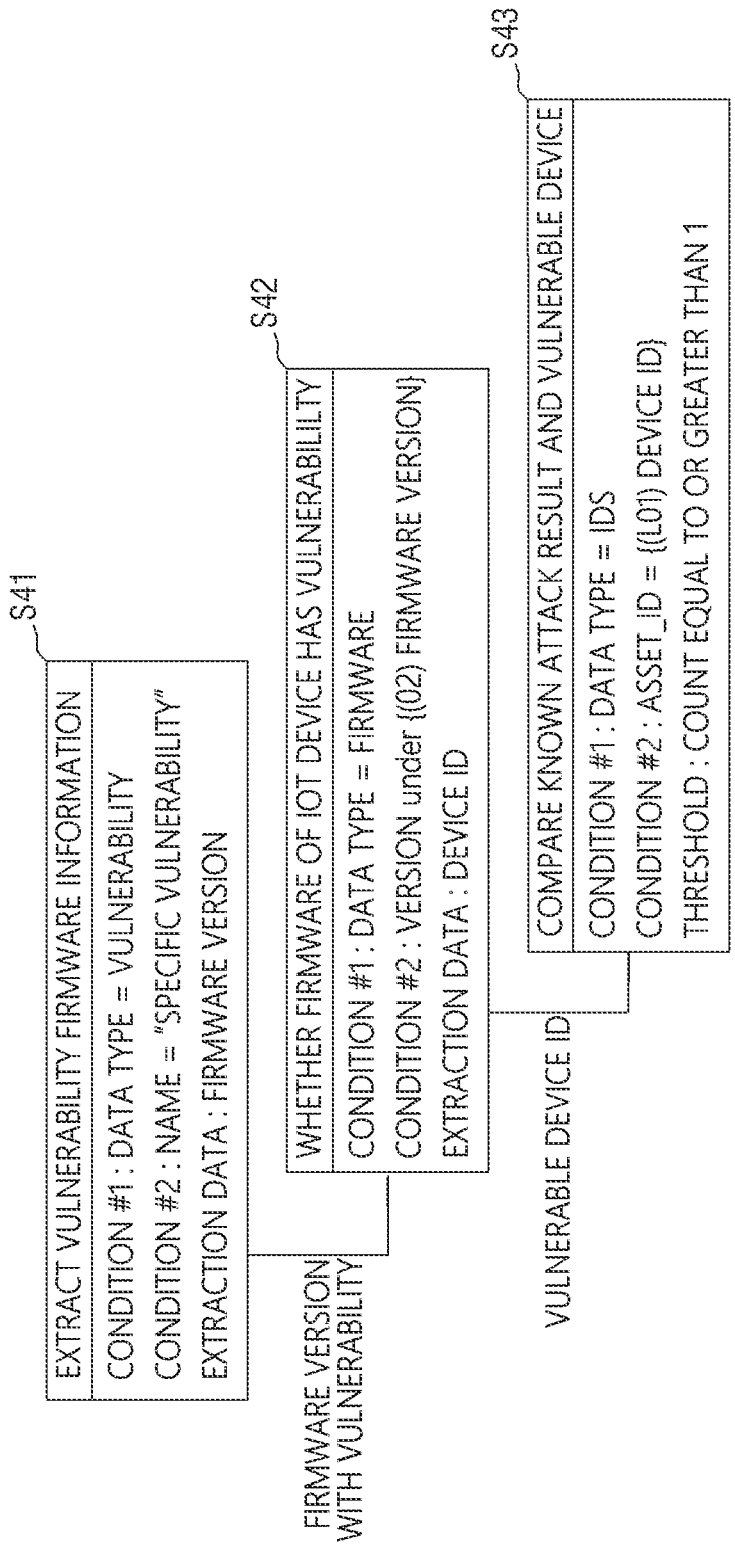
FIG. 7 is an exemplary diagram for describing an operation of detecting attack behavior against a device using firmware with a known vulnerability by applying the method for detecting abnormal behavior in a network described with reference to FIG. 2.

FIG. 7 is an exemplary diagram for describing an operation of detecting an attack behavior against a device using firmware with known vulnerability by applying the method for detecting abnormal behavior in a network described with reference to FIG. 2.

Referring to FIG. 7, in step S41, firmware data, in which vulnerability data exists, may be extracted. This step may be performed by any one of a plurality of individual rules.

Next, in step S42, a device ID executed by firmware data, in which vulnerability data exists, among a plurality of IoT devices connected to the network may be extracted. This step may be performed by any one of a plurality of association rules.

Next, in step S43, the result of detecting the attack behavior against the device corresponding to the device ID may be extracted. This step may be performed by any one of a plurality of association rules.

According to the steps described above, the result of detecting an attack behavior against a device having a vulnerability may be extracted. For example, based on a warning message being output based on the number of output data being greater than or equal to the threshold value of 1, a warning message may be output based on the number of output data in step S43 being greater than or equal to 1, so that attack behavior against a device using firmware with known vulnerability may be detected and a warning message may be transmitted to the user.

In some embodiments related to step S43, the number of attack behaviors against the device using the firmware with vulnerability may be extracted based on a result of detecting the attack behavior against the device using the firmware with vulnerability. At this time, based on the number of attacks being greater than or equal to the threshold, a warning message may be transmitted to the user. This step may be performed by any one of a plurality of association rules.

Figure 8:
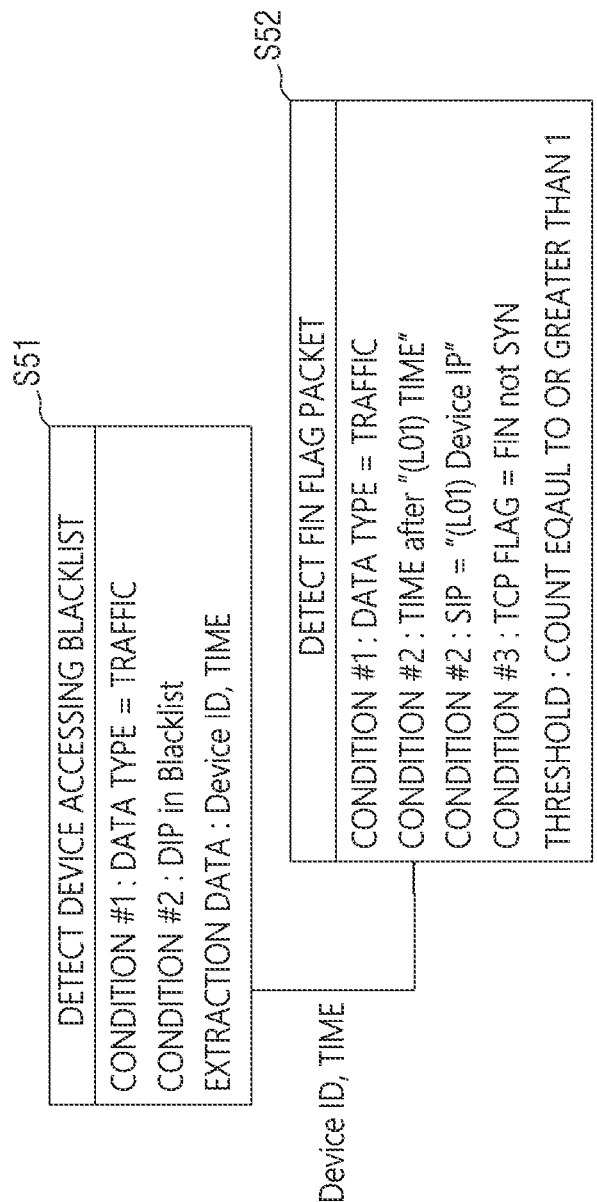
FIG. 8 is an exemplary diagram for describing an operation of detecting stealth scanning behavior by applying the method for detecting abnormal behavior in a network described with reference to FIG. 2.

FIG. 8 is an exemplary diagram for describing an operation of detecting a stealth scanning behavior by applying the method for detecting abnormal behavior in a network described with reference to FIG. 2.

Referring to FIG. 8, in step S51, a device ID visiting a domain included in a predetermined blacklist list may be extracted from collected traffic data. This step may be performed by any one of a plurality of individual rules.

Next, in step S52, the number of FIN packets transmitted in the IP band of the device corresponding to the device ID may be extracted. This step may be performed by any one of a plurality of association rules.

According to the steps described above, the number of FIN packets transmitted in the IP band of the device visiting the domain included in the blacklist list may be extracted. For example, based on a warning message being output based on the number of output data being greater than or equal to the threshold, a warning message may be output based on the number of output data in step S52 being greater than or equal to the threshold, so that a warning message detecting stealth scanning behavior may be transmitted to the user.

In some embodiments related to step S52, the number of SYN packets transmitted in the IP band of the device corresponding to the device ID may be extracted. This step may be performed by any one of a plurality of association rules. According to the present embodiment, a warning message may be output based on the number of FIN packets transmitted in an IP band of a device visiting a domain included in the blacklist list being greater than or equal to the first threshold and the number of SYN packets may be less than or equal to the second threshold. For example, based on the warning message being output based on the number of FIN packets being greater than or equal to the first threshold and the number of SYN packets being less than or equal to the second threshold of 0, the warning message may be output based on the number of SYN packets, which may be the output data of step S52, may be 0, and the number of FIN packets being greater than or equal to the first threshold.

Figure 9:
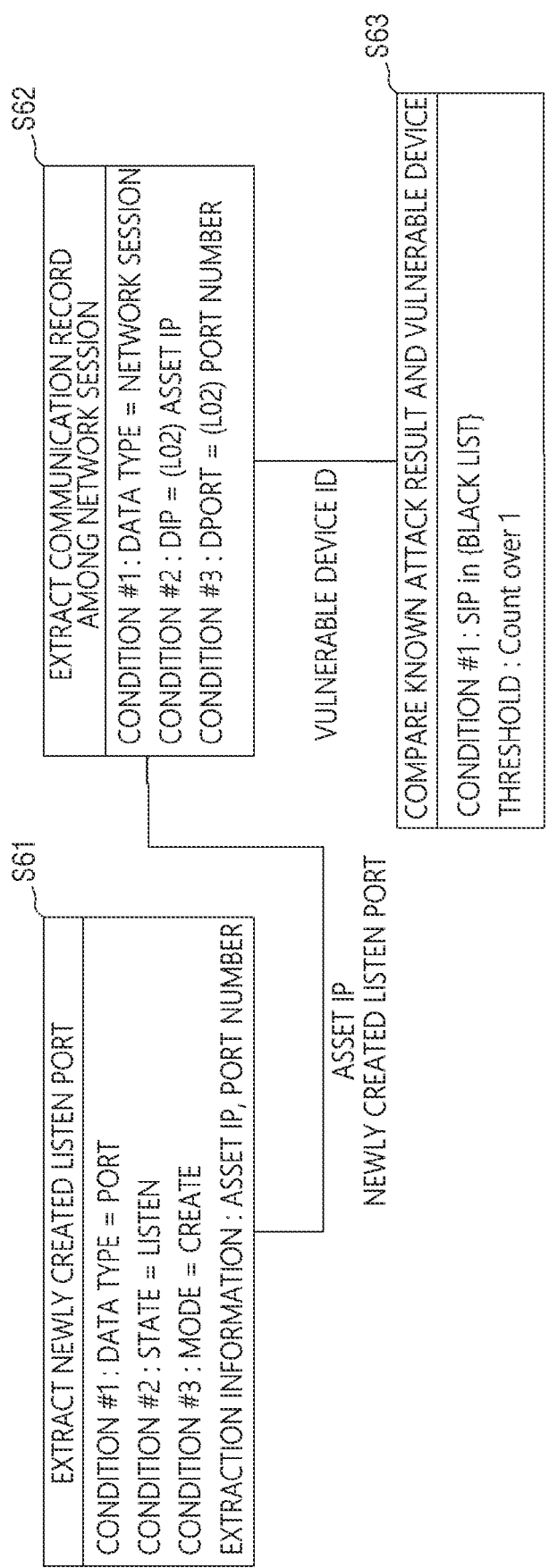
FIG. 9 is an exemplary diagram for describing an operation of detecting communication behavior with a blacklist target by applying the method for detecting abnormal behavior in a network described with reference to FIG. 2.

FIG. 9 is an exemplary diagram for describing an operation of detecting a communication behavior with a blacklist target by applying the method for detecting abnormal behavior in a network described with reference to FIG. 2.

Referring to FIG. 9, in step S61, the listen port list of a plurality of IoT devices connected to a network may be extracted, and a newly created listen port may be extracted from the listen port list. This step may be performed by any one of a plurality of individual rules. Further, it may be performed by any one of a plurality of association rules.

Next, in step S62, a network session list connected to the newly created listen port may be extracted. This step may be performed by any one of a plurality of association rules.

Next, in step S63, network session data included in a predetermined blacklist list from network session data included in the network session list may be extracted. This step may be performed by any one of a plurality of association rules.

According to the steps described above, the network session data included in the blacklist list may be extracted from the network session data accessed to the newly created listen port. For example, based on a warning message being output based on the number of output data being greater than or equal to the threshold of 1, a warning message may be output based on the number of output data in step S63 being greater than or equal to 1, so that a warning message for communication behavior with the blacklist target may be transmitted to the user.

So far, with reference to FIGS. 2 to 9, a method for detecting abnormal behavior in a network according to another embodiment of the present disclosure and its application field have been described. According to the present embodiment, abnormal behavior in the network can be detected by various analysis scenarios based on the relevancy between a plurality of rules. Further, by associating another association rule with the association rule, abnormal behavior in the network can be detected by more various analysis scenarios.

Hereinafter, an exemplary computing device 1500 that can implement an apparatus and a system, according to various embodiments of the present disclosure will be described with reference to FIG. 10.

Figure 10:
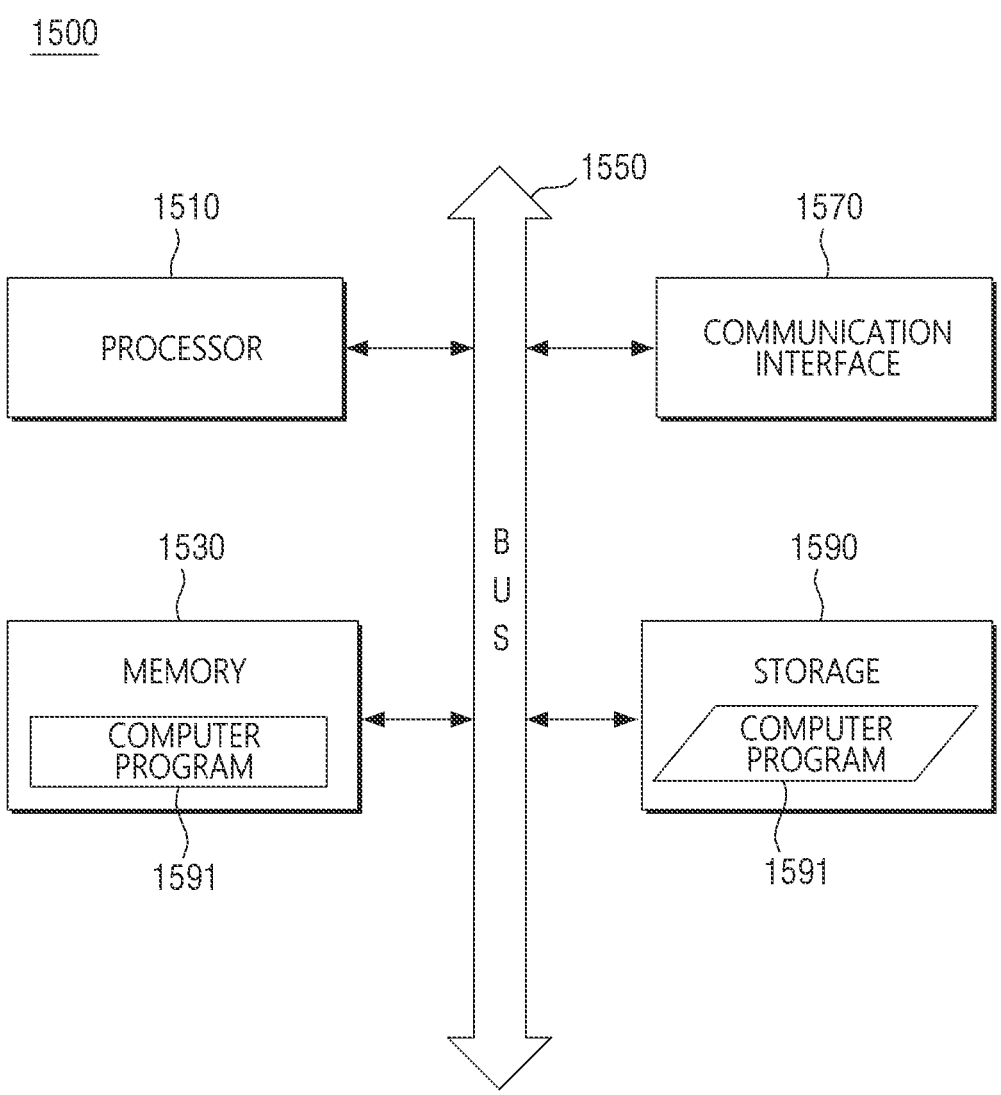
FIG. 10 is a hardware configuration diagram of an apparatus for detecting abnormal behavior in a network according to another embodiment of the present disclosure.

FIG. 10 is an example hardware diagram illustrating a computing device 1500.

As shown in FIG. 10, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 10 illustrates the components related to the embodiment of the present disclosure. It will be appreciated by those skilled in the art that the present disclosure may further include other general purpose components in addition to the components shown in FIG. 10.

The processor 1510 may control overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 may store various data, instructions and/or information. The memory 1530 may load one or more programs 1591 from the storage 1590 to execute methods/operations according to various embodiments of the present disclosure. For example, based on the computer program 1591 being loaded into the memory 1530, the logic as shown in FIG. 4 may be implemented on the memory 1530. An example of the memory 1530 may be a RAM, but may not be limited thereto.

The bus 1550 may provide communication between components of the computing device 1500. The bus 1550 may be implemented as various types of bus such as an address bus, a data bus and a control bus.

The communication interface 1570 may support wired and wireless internet communication of the computing device 1500. The communication interface 1570 may support various communication methods other than internet communication. To this end, the communication interface 1570 may be configured to comprise communication module based on hardware and/or software well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure may be implemented. Based on the computer program 1591 being loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations may be shown in an order in the drawings, those skilled in the art will appreciate that many variations and modifications can be made to the embodiments without substantially departing from the principles of the present disclosure. The disclosed embodiments of the present disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method performed by a computing device for detecting abnormal behavior in a network comprising:
    obtaining a plurality of individual rules, wherein an individual rule of the plurality of individual rules is for extracting first output data from at least one input data set among a plurality of input data sets, the first output data satisfying a first extraction condition;
    obtaining a plurality of association rules, wherein an association rule of the plurality of association rules is for extracting second output data from at least one of the plurality of input data sets and the first output data, the second output data satisfying a second extraction condition; and
    detecting abnormal behavior in a network based on third output data, the third output data being extracted using one of the plurality of individual rules and the plurality of association rules
    wherein the abnormal behavior in the network includes changing a host file of a router,
    wherein the plurality of individual rules include a rule for extracting data associated with changes of the host file,
    wherein the plurality of association rules include a first association rule for extracting a first domain name from among domain names directed by the changed host file, the first domain name being included in a predetermined blacklist list.

2. The method of claim 1,
wherein the association rules include a rule for extracting fourth output data satisfying a fourth extraction condition from the second output data.

3. The method of claim 1,
wherein the detecting abnormal behavior in the network comprises,
determining whether an attribute value of the third output data is equal to or greater than a threshold.

4. The method of claim 3,
wherein the attribute value includes a number of the third output data, a number of groups included in the third output data and a number of data of a target group included in the third output data.

5. The method of claim 1,
wherein the detecting abnormal behavior in the network comprises,
determining whether an interval of extraction times of items in the third output data is equal to or less than a threshold.

6. The method of claim 1,
wherein abnormal behavior in the network is unauthorized eavesdropping behavior of an artificial intelligence speaker (AI speaker),
wherein the abnormal behavior in the network includes an unauthorized eavesdropping behavior of an artificial intelligence speaker (AI speaker),
wherein the plurality of individual rules include a rule for extracting a first identification (ID) of a first process obtaining a microphone input from among identifications (IDs) of processes run by the AI speaker,
wherein the plurality of association rules include:
    a second association rule for extracting a first ID of a first file generated by the first process among files existing in the AI speaker,
    a third association rule for extracting a list of second IDs of second processes accessing the first file from among IDs of processes run by the AI speaker,
    a fourth association rule for extracting a list of network sessions corresponding to each of the second processes,
    a fifth association rule for extracting, based on a predetermined blacklist, a subset of network session data from among entire network session data corresponding to the list of network sessions.

7. The method of claim 1,
wherein the abnormal behavior in the network includes an attack against a device using firmware with a known vulnerability,
wherein the plurality of individual rules include a rule for identifying a first firmware of an internet of things (IoT) devices connected to the network,
wherein the plurality of association rules include:
    a sixth association rule for identifying known vulnerability associated with the first firmware,
    a seventh association rule for detecting an attack corresponding to the identified known vulnerability.

8. The method of claim 7,
wherein the plurality of association rules include a eighth association rule for extracting a number of the attacks against at least one of the plurality of IoT devices based on results of the detection.

9. The method of claim 1,
wherein the abnormal behavior in the network includes a stealth scanning behavior,
wherein the plurality of individual rules include a rule for extracting a device identification (ID) of a device visiting a domain included in a predetermined blacklist list from collected traffic data,
wherein the plurality of association rules include a ninth association rule for extracting a number of finish packets (FIN packets) transmitted in a range of internet protocol (IP) addresses corresponding to an IP address of a device having the device ID.

10. The method of claim 9,
wherein the plurality of association rules further include a tenth association rule for extracting a number of synchronization packets (SYN) packets transmitted in a range of IP addresses corresponding to an IP address of a device having the device ID,
wherein the detecting abnormal behavior in the network comprises,
outputting a warning message based on the number of the FIN packets being greater than or equal to a first threshold or a number of the SYN packets being less than or equal to a second threshold.

11. The method of claim 1,
wherein the abnormal behavior in the network includes communicating with a device included in a predetermined blacklist,
wherein the plurality of individual rules include a rule for extracting a list of listen ports of a plurality of internet of things (IoT) devices connected to the network,
wherein the plurality of association rules include:
a eleventh association rule for extracting a newly created listen port from the list of listen ports,
a twelfth association rule for extracting a list of network sessions connected to the newly created listen port,
a thirteenth association rule for extracting, based on a predetermined blacklist, a subset of network session data from among entire network session data corresponding to the list of network sessions.

12. An apparatus for detecting abnormal behavior in a network comprising:
a processor;
a network interface;
a memory; and
a computer program loaded into the memory and executed by the processor,
wherein the computer program comprises,
a first instruction for obtaining a plurality of individual rules, wherein an individual rule of the plurality of individual rules is for extracting first output data from at least one input data set among a plurality of input data sets, the first output data satisfying a first extraction condition;
a second instruction for obtaining a plurality of association rules, wherein an association rule of the plurality of association rules is for extracting second output data from at least one of the plurality of input data sets and the first output data, the second output data satisfying a second extraction condition; and
a third instruction for detecting abnormal behavior in a network based on third output data, the third output data being extracted using one of the plurality of individual rules and the plurality of association rules wherein the abnormal behavior in the network includes an attack against a device using firmware with a known vulnerability,
wherein the plurality of individual rules include a first individual rule for identifying a first firmware of an internet of things (IoT) devices connected to the network,
wherein the plurality of association rules include:
a first association rule for identifying known vulnerability associated with the first firmware,
a second association rule for detecting an attack corresponding to the identified known vulnerability.

13. The apparatus for detecting abnormal behavior in a network of claim 12,
wherein abnormal behavior in the network is unauthorized eavesdropping behavior of an artificial intelligence speaker (AI speaker),
wherein the abnormal behavior in the network includes an unauthorized eavesdropping behavior of an AI speaker,
wherein the plurality of individual rules include a rule for extracting a first identification (ID) of a first process obtaining a microphone input from among identifications (IDs) of processes run by the AI speaker,
wherein the plurality of association rules include:
a third association rule for extracting a first ID of a first file generated by the first process among files existing in the AI speaker,
a fourth association rule for extracting a list of second IDs of second processes accessing the first file from among IDs of processes run by the AI speaker,
a fifth association rule for extracting a list of network sessions corresponding to each of the second processes,
a sixth association rule for extracting, based on a predetermined blacklist, a subset of network session data from among entire network session data corresponding to the list of network sessions.

14. The apparatus for detecting abnormal behavior in a network of claim 12,
wherein the abnormal behavior in the network includes changing a host file of a router,
wherein the plurality of individual rules include a rule for extracting data associated with changes of the host file,
wherein the plurality of association rules include a seventh association rule for extracting a first domain name from among domain names directed by the changed host file, the first domain name being included in a predetermined blacklist list.

15. The apparatus for detecting abnormal behavior in a network of claim 12,
wherein the abnormal behavior in the network includes a stealth scanning behavior,
wherein the plurality of individual rules include a first individual rule for extracting a device identification (ID) of a device visiting a domain included in a predetermined blacklist list from collected traffic data,
wherein the plurality of association rules include a eighth association rule for extracting a number of finish packets (FIN packets) transmitted in a range of internet protocol (IP) addresses corresponding to an IP address of a device having the device ID.

16. The apparatus for detecting abnormal behavior in a network of claim 12,
wherein the abnormal behavior in the network includes communicating with a device included in a predetermined blacklist, wherein the plurality of individual rules include a first individual rule for extracting a list of listen ports of a plurality of IoT devices connected to the network, wherein the plurality of association rules include:
   a ninth association rule for extracting a newly created listen port from the list of listen ports,
   a tenth association rule for extracting a list of network sessions connected to the newly created listen port,
   a eleventh association rule for extracting, based on a predetermined blacklist, a subset of network session data from among entire network session data corresponding to the list of network sessions.

17. A computer-readable recording medium recording a computer program including computer program instructions executable by a processor for detecting abnormal behavior in a network, wherein the computer program instructions are executed by a processor of a computing device for performing operations comprising, obtaining a plurality of individual rules, wherein an individual rule of the plurality of individual rules is for extracting first output data from at least one input data set among a plurality of input data sets, the first output data satisfying a first extraction condition;

obtaining a plurality of association rules, wherein an association rule of the plurality of association rules is for extracting second output data from at least one of the plurality of input data sets and the first output data, the second output data satisfying a second extraction condition; and detecting abnormal behavior in a network based on third output data, the third output data being extracted using one of the plurality of individual rules and the plurality of association rules wherein the abnormal behavior in the network includes a stealth scanning behavior, wherein the plurality of individual rules include a first individual rule for extracting a device identification (ID) of a device visiting a domain included in a predetermined blacklist list from collected traffic data, wherein the plurality of association rules include a first association rule for extracting a number of finish packets (FIN packets) transmitted in a range of internet protocol (IP) addresses corresponding to an IP address of a device having the device ID.

18. The computer-readable recording medium of claim 17, wherein the association rules includes a rule for extracting fourth output data satisfying a fourth extraction condition from the second output data.

\* \* \* \* \*